United States Patent
Toshimitsu

(10) Patent No.: US 12,162,154 B2
(45) Date of Patent: Dec. 10, 2024

(54) ROBOT SYSTEM, CONTROL DEVICE, AND CONTROL METHOD

(71) Applicant: Seiko Epson Corporation, Tokyo (JP)

(72) Inventor: Shunsuke Toshimitsu, Azumino (JP)

(73) Assignee: SEIKO EPSON CORPORATION (JP)

( * ) Notice: Subject to any disclaimer, the term of this patent is extended or adjusted under 35 U.S.C. 154(b) by 322 days.

(21) Appl. No.: 17/702,923

(22) Filed: Mar. 24, 2022

(65) Prior Publication Data
US 2022/0305651 A1   Sep. 29, 2022

(30) Foreign Application Priority Data

Mar. 25, 2021  (JP) ................................. 2021-051240

(51) Int. Cl.
*B25J 9/16* (2006.01)
*B25J 9/04* (2006.01)
*B25J 13/00* (2006.01)

(52) U.S. Cl.
CPC ........... *B25J 9/1651* (2013.01); *B25J 9/1615* (2013.01); *B25J 9/1638* (2013.01); *B25J 9/1664* (2013.01)

(58) Field of Classification Search
CPC ...... B25J 9/1651; B25J 9/1615; B25J 9/1638; B25J 9/1664; B25J 9/04; B25J 9/041; B25J 9/16; B25J 13/00; G05B 2219/40454; G05B 2219/43203
See application file for complete search history.

(56) References Cited

U.S. PATENT DOCUMENTS

| | | | |
|---|---|---|---|
| 2001/0033146 A1 | 10/2001 | Kato et al. | |
| 2006/0082340 A1* | 4/2006 | Watanabe | B25J 9/163 318/568.23 |
| 2006/0206284 A1* | 9/2006 | Hirabayashi | B25J 9/1651 702/141 |
| 2022/0112934 A1* | 4/2022 | Phillips | F16F 7/1005 |
| 2022/0379468 A1* | 12/2022 | Hansen | B25J 13/088 |

FOREIGN PATENT DOCUMENTS

JP       2001-293638 A    10/2001

* cited by examiner

*Primary Examiner* — Adam R Mott
*Assistant Examiner* — Heather J Keniry
(74) *Attorney, Agent, or Firm* — Harness, Dickey & Pierce, P.L.C.

(57) ABSTRACT

A robot system includes a SCARA robot including a robot arm to which an end effector is attached and a driving section configured to drive the robot arm and a control device configured to control the driving section based on a control signal. The control device determines whether being in a first case in which a predetermined condition is satisfied or a second case in which the predetermined condition is not satisfied, in the first case, controls the driving section based on the control signal, and, in the second case, determines a frequency component to be removed from the control signal using a band stop filter, removes the frequency component from the control signal using the band stop filter to generate a corrected control signal, and controls the driving section based on the generated corrected control signal.

8 Claims, 7 Drawing Sheets

ROBOT SYSTEM, CONTROL DEVICE, AND CONTROL METHOD

The present application is based on, and claims priority from JP Application Serial Number 2021-051240, filed Mar. 25, 2021, the disclosure of which is hereby incorporated by reference herein in its entirety.

BACKGROUND

1. Technical Field

The present disclosure relates to a robot system, a control device, and a control method.

2. Related Art

For example, JP-A-2001-293638 (Patent Literature 1) states that, in a robot including an arm, to the distal end of which an end effector is attached, if the shape of the end effector is large, since it is likely that vibration occurs in the end effector itself and work efficiency decreases when the robot is operated, a natural frequency in a state in which a hand is gripping a workpiece is measured in advance and a band stop filter is applied to a torque control signal for operating the arm according to the measured natural frequency.

However, high work efficiency sometimes can be exerted if the band stop filter is not applied to a specific operation. Therefore, if the band stop filter is applied to all operations, the work efficiency is likely to degrease to the contrary.

SUMMARY

A robot system according to an aspect of the present disclosure includes: a SCARA robot including a robot arm to which an end effector is attached and a driving section configured to drive the robot arm; and a control device configured to control the driving section based on a control signal. The control device: determines whether being in a first case in which at least one condition of conditions A to E described below is satisfied or a second case in which all of the conditions A to E are not satisfied; in the first case, controls the driving section based on the control signal; and, in the second case, determines a frequency component to be removed from the control signal using a band stop filter, removes the frequency component from the control signal using the band stop filter to generate a corrected control signal, and controls the driving section based on the generated corrected control signal. The condition A: The robot system has a first driving mode and a second driving mode in which an upper limit value of acceleration of the robot arm is smaller than that in the first driving mode and drives the robot arm in the second driving mode. The condition B: A separation distance between a center of gravity of the end effector and a distal end of the robot arm is equal to or larger than a predetermined value. The condition C: An end point of an operation of the robot arm is unknown. The condition D: When the robot arm includes an arm and a shaft that rises and falls in a vertical direction with respect to the arm, a projection amount of the shaft in the vertical direction from the arm is equal to or smaller than a predetermined value. The condition E: A total of weight of the end effector and weight of a workpiece held by the end effector is equal to or smaller than a predetermined value.

A control device according to an aspect of the present disclosure is a control device that controls, based on a control signal, a SCARA robot including a robot arm to which an end effector is attached and a driving section configured to drive the robot arm, the control device: determining whether being in a first case in which at least one condition of conditions A to E described below is satisfied or a second case in which all of the conditions A to E are not satisfied; in the first case, controlling the driving section based on the control signal; and, in the second case, determining a frequency component to be removed from the control signal using a band stop filter, removing the frequency component from the control signal using the band stop filter to generate a corrected control signal, and controlling the driving section based on the generated corrected control signal. The condition A: The control device has a first driving mode and a second driving mode in which an upper limit value of acceleration of the robot arm is smaller than that in the first driving mode and drives the robot arm in the second driving mode. The condition B: A separation distance between a center of gravity of the end effector and a distal end of the robot arm is equal to or larger than a predetermined value. The condition C: An end point of an operation of the robot arm is unknown. The condition D: When the robot arm includes an arm and a shaft that rises and falls in a vertical direction with respect to the arm, a projection amount of the shaft in the vertical direction from the arm is equal to or smaller than a predetermined value. The condition E: A total of weight of the end effector and weight of a workpiece held by the end effector is equal to or smaller than a predetermined value.

A control method according to an aspect of the present disclosure is a control method for controlling, based on a control signal, a SCARA robot including a robot arm to which an end effector is attached and a driving section configured to drive the robot arm, the control method including: a frequency-component determining step for determining a frequency component to be removed from the control signal using a band stop filter; a corrected-control-signal generating step for removing the frequency component from the control signal using the band stop filter to generate a corrected control signal; and a control step for, in a first case in which at least one condition of conditions A to E described below is satisfied, controlling the driving section according to the control signal, and, in a second case in which all of the conditions A to E are not satisfied, controlling the driving section according to the corrected control signal. The condition A: The control method has a first driving mode and a second driving mode in which an upper limit value of acceleration of the robot arm is smaller than that in the first driving mode and drives the robot arm in the second driving mode. The condition B: A separation distance between a center of gravity of the end effector and a distal end of the robot arm is equal to or larger than a predetermined value. The condition C: An end point of an operation of the robot arm is unknown. The condition D: When the robot arm includes an arm and a shaft that rises and falls in a vertical direction with respect to the arm, a projection amount of the shaft in the vertical direction from the arm is equal to or smaller than a predetermined value. The condition E: A total of weight of the end effector and weight of a workpiece held by the end effector is equal to or smaller than a predetermined value.

A control method according to an aspect of the present disclosure is a control method for controlling, based on a control signal, a SCARA robot including a robot arm to which an end effector is attached and a driving section configured to drive the robot arm, the control method including: a determining step for determining whether being in a first case in which at least one condition of conditions A to E described below is satisfied or a second case in which all of the conditions A to E are not satisfied, in the second case, the control method further including: a frequency-component determining step for determining a frequency component to be removed from the control signal using a band stop filter; a corrected-control-signal generating step for removing the frequency component from the control signal using the band stop filter to generate a corrected control signal; and a first control step for controlling the driving section according to the corrected control signal. The condition A: The control method has a first driving mode and a second driving mode in which an upper limit value of acceleration of the robot arm is smaller than that in the first driving mode and drives the robot arm in the second driving mode. The condition B: A separation distance between a center of gravity of the end effector and a distal end of the robot arm is equal to or larger than a predetermined value. The condition C: An end point of an operation of the robot arm is unknown. The condition D: When the robot arm includes an arm and a shaft that rises and falls in a vertical direction with respect to the arm, a projection amount of the shaft in the vertical direction from the arm is equal to or smaller than a predetermined value. The condition E: A total of weight of the end effector and weight of a workpiece held by the end effector is equal to or smaller than a predetermined value.

DESCRIPTION OF EXEMPLARY EMBODIMENTS

A robot system, a control device, and a control method according to the present disclosure are explained in detail below with reference to preferred embodiments shown in the accompanying drawings.

Figure 1:
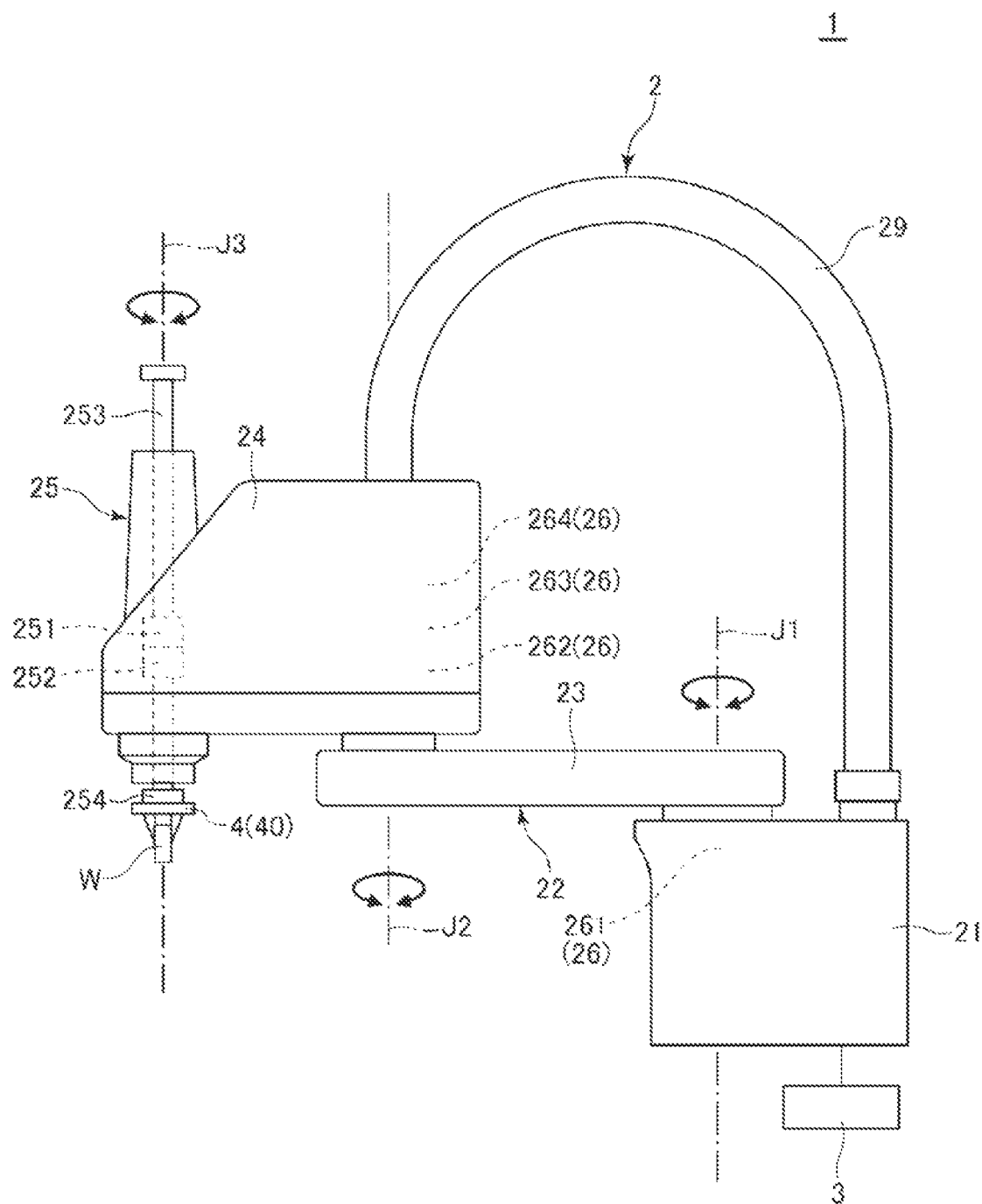
FIG. 1 is an overall configuration diagram of a robot system according to a first embodiment.
Figure 2:
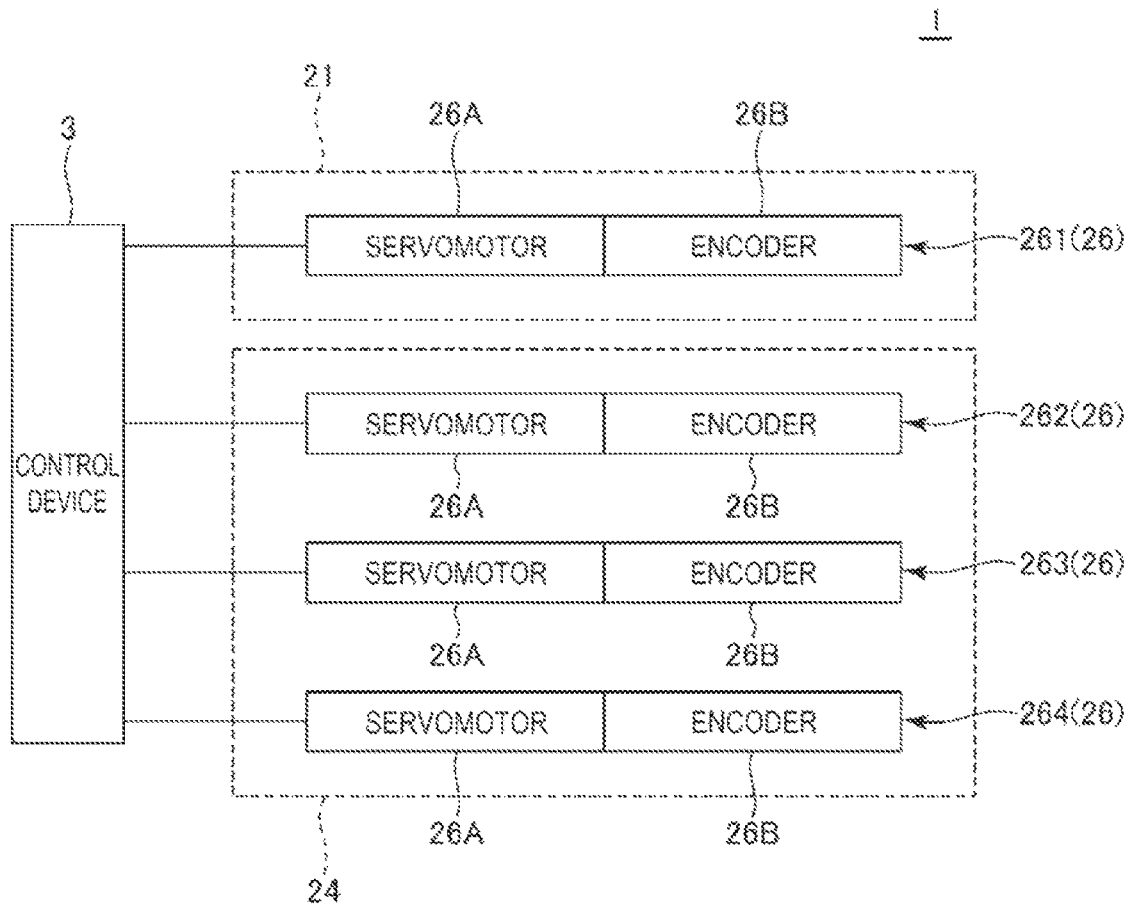
FIG. 2 is a block diagram showing the configuration of a driving section.
Figure 3:
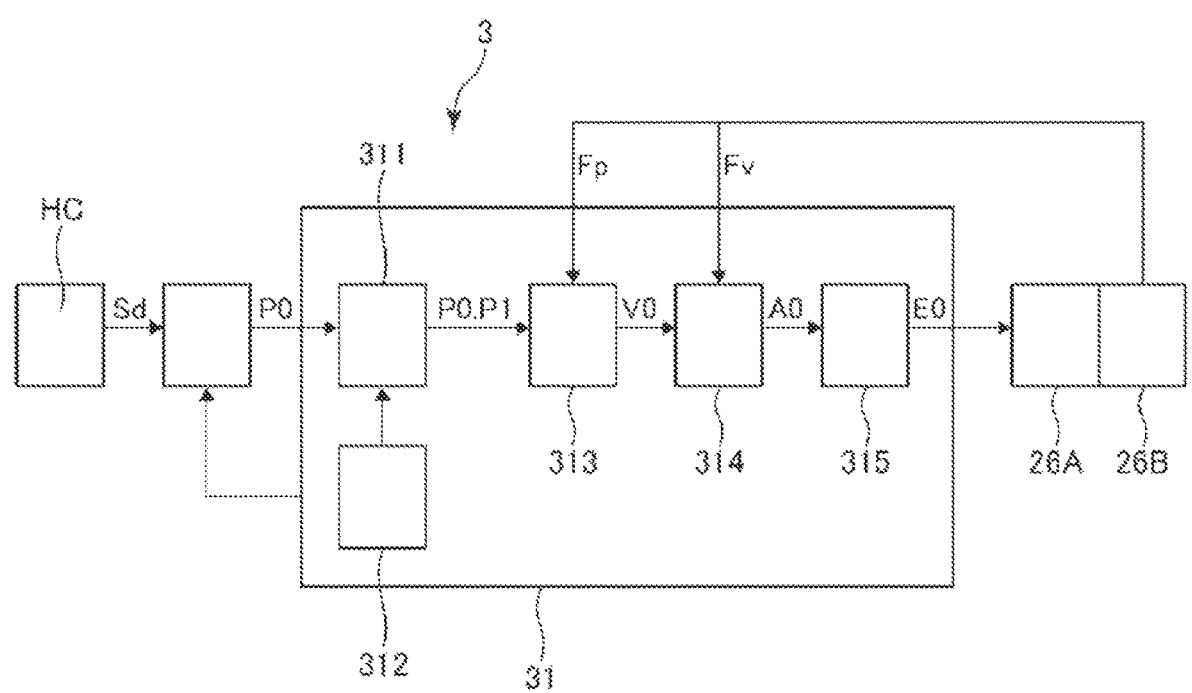
FIG. 3 is a block diagram showing a driving control system included in a control device.
Figure 4:
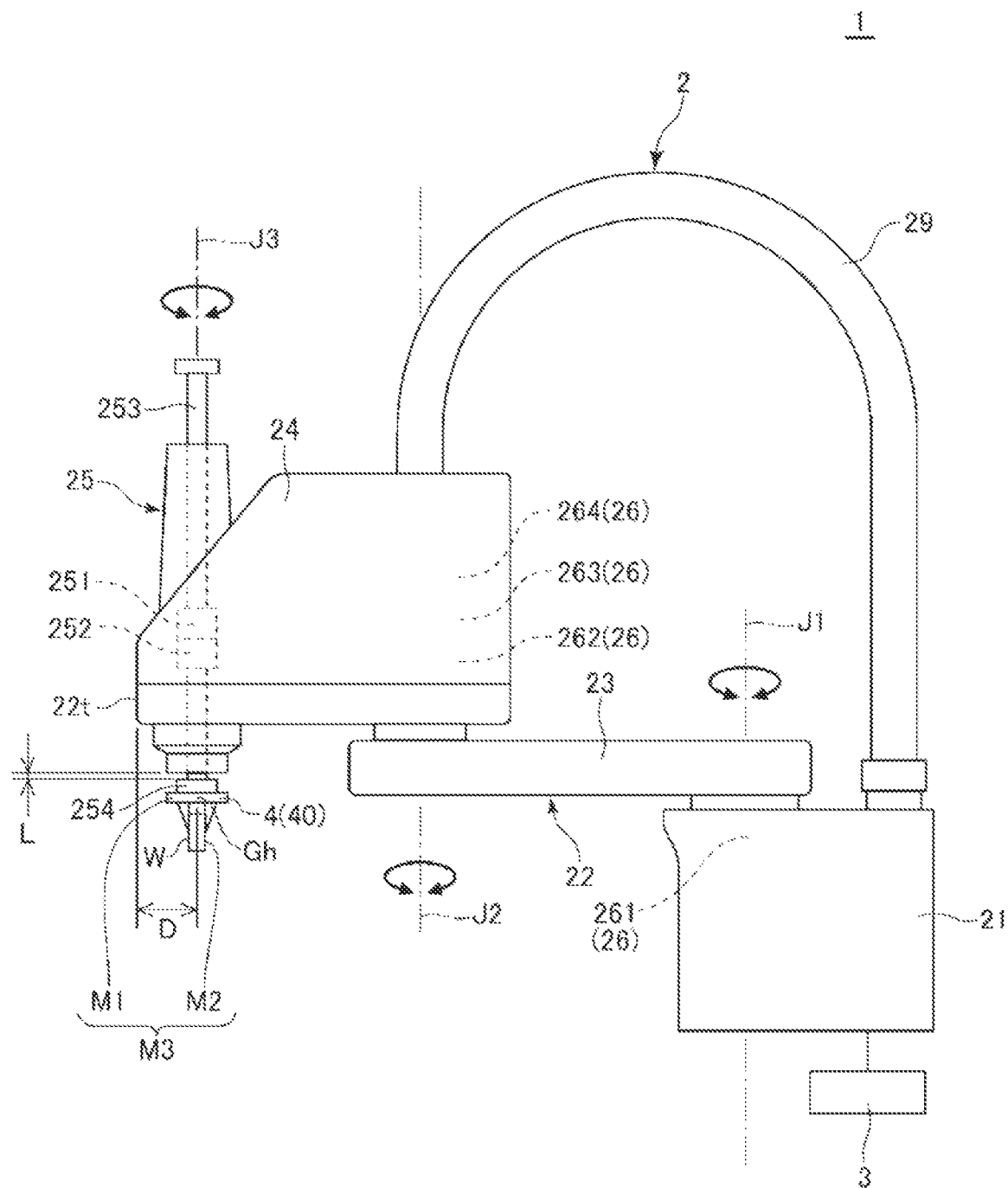
FIG. 4 is a diagram for explaining conditions of use of a band stop filter.
Figure 5:
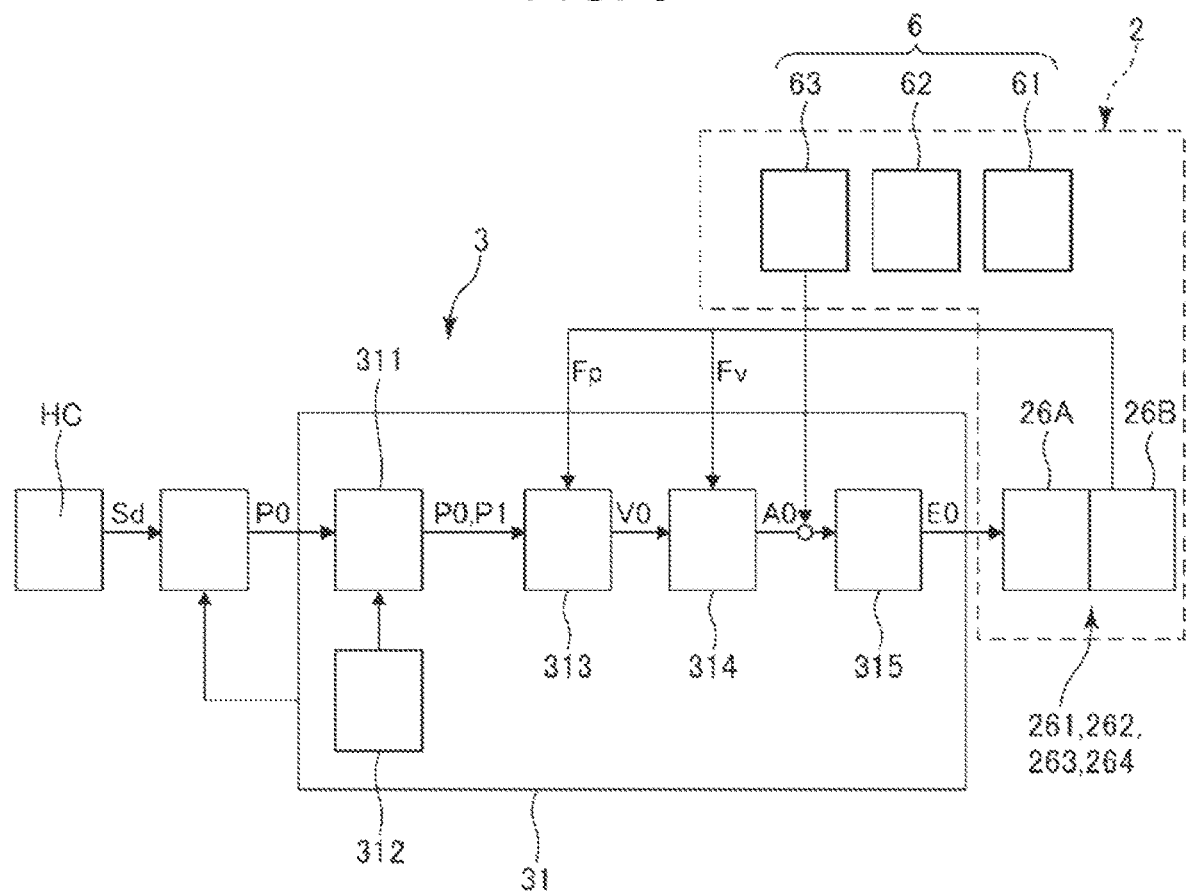
FIG. 5 is a diagram for explaining the conditions of use of the band stop filter.
Figure 6:
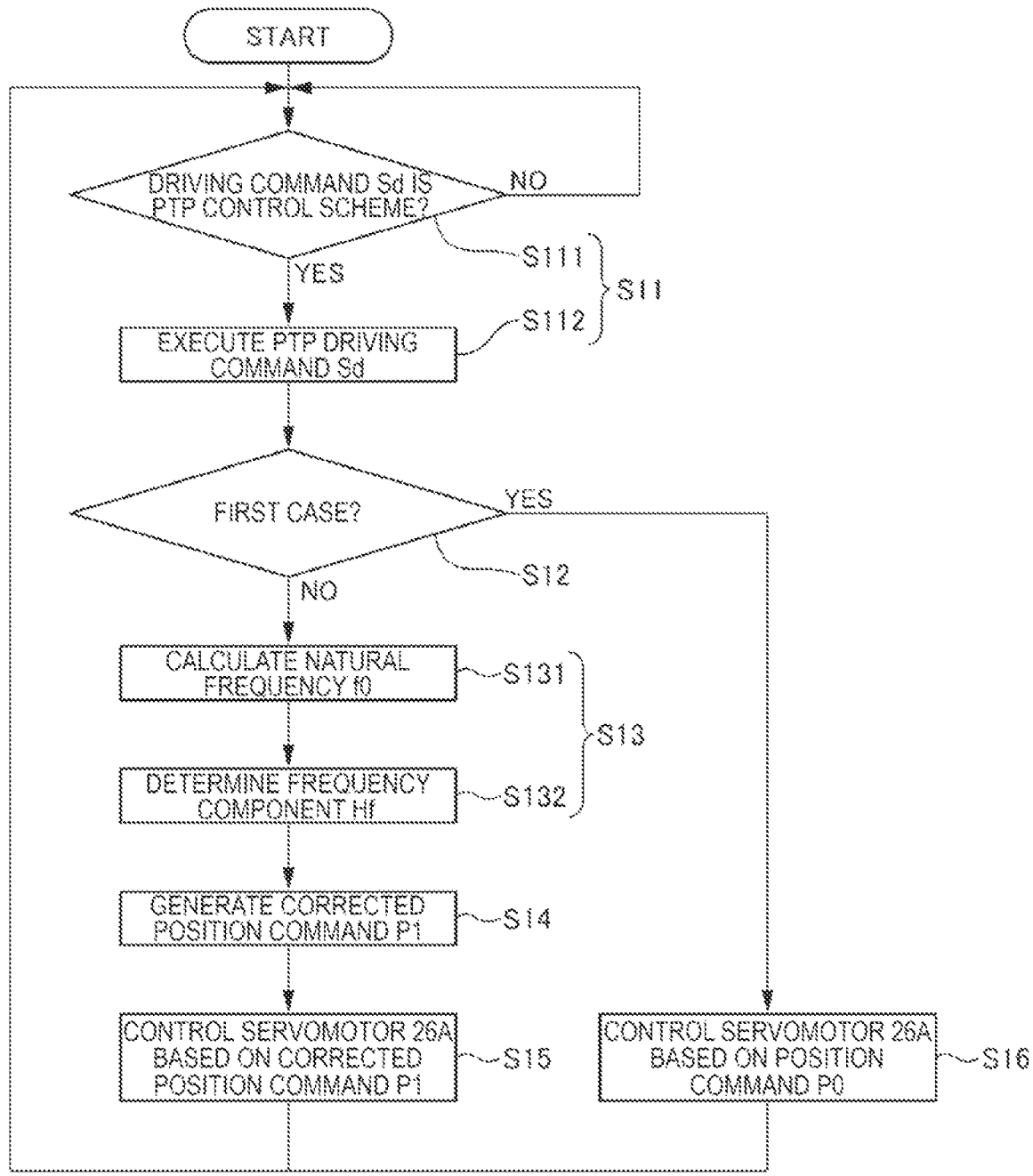
FIG. 6 is a flowchart showing a control method for a SCARA robot.

FIG. 1 is an overall configuration diagram of a robot system according to a first embodiment. FIG. 2 is a block diagram showing the configuration of a driving section. FIG. 3 is a block diagram showing a driving control system included in a control device. FIGS. 4 and 5 are respectively diagrams for explaining conditions of use of a band stop filter. FIG. 6 is a flowchart showing a control method for a SCARA (selective compliance assembly robot arm) robot.

A robot system 1 shown in FIG. 1 includes a SCARA robot 2 and a control device 3 that controls the SCARA robot 2.

SCARA Robot 2

The SCARA robot 2 is called a horizontal articulated robot as well and is used in work such as holding, conveyance, assembly, and inspection of a workpiece such as an electronic component. However, uses of the SCARA robot 2 are not particularly limited.

The SCARA robot 2 includes a base 21 fixed to a floor, a robot arm 22 coupled to the base 21, and a pipe 29 coupling the base 21 and the robot arm 22. The robot arm 22 includes a first arm 23, the proximal end portion of which is coupled to the base 21, the first arm 23 being capable of turning around a first turning axis J1 with respect to the base 21, a second arm 24, the proximal end portion of which is coupled to the distal end portion of the first arm 23, the second arm 24 being capable of turning around a second turning axis J2 parallel to the first turning axis J1 with respect to the first arm 23, and a work head 25 disposed at the distal end portion of the second arm 24.

The work head 25 includes a spline nut 251 and a ball screw nut 252 coaxially disposed side by side in a Z-axis direction at the distal end portion of the second arm 24 and a spline shaft 253 inserted through the spline nut 251 and the ball screw nut 252. The spline shaft 253 is capable of turning around a third turning axis J3, which is the center axis of the spline shaft 253, with respect to the second arm 24 and is capable of rising and falling in the direction along the third turning axis J3.

In this embodiment, the first turning axis J1, the second turning axis J2, and the third turning axis J3 are parallel to one another and extend along the vertical direction. However, the first turning axis J1, the second turning axis J2, and the third turning axis J3 may extend along a direction inclined with respect to the vertical direction. At least one axis of the first turning axis J1, the second turning axis J2, and the third turning axis J3 may be inclined with respect to the other axes. The configuration of the robot arm 22 is not particularly limited. For example, at least one arm may be further coupled between the first arm 23 and the second arm 24.

A payload 254 for attaching an end effector 4 is provided at the lower end portion of the spline shaft 253. The end effector 4 attached to the payload 254 is not particularly limited. Examples of the end effector 4 include a hand that holds a workpiece W and a work tool that machines the workpiece W. The end effector 4 in this embodiment is a hand 40 that clamps and holds the workpiece W with a pair of claw sections.

The SCARA robot 2 includes a driving section 26 that drives the robot arm 22. The driving section 26 includes a driving device 261 that turns the first arm 23 around the first turning axis J1 with respect to the base 21, a driving device 262 that turns the second arm 24 around the second turning axis J2 with respect to the first arm 23, a driving device 263 that rotates the spline nut 251 to rotate the spline shaft 253 around the third turning axis J3, and a driving device 264 that rotates the ball screw nut 252 to lift and lower the spline shaft 253 in the direction along the third turning axis J3.

The driving device 261 is disposed in the base 21. The remaining driving devices 262, 263, and 264 are disposed in the second arm 24. As shown in FIG. 2, the driving devices 261, 262, 263, and 264 respectively include servomotors 26A functioning as driving sources and encoders 26B that detect rotation amounts of the servomotors 26A.

Control Device 3

The control device 3 performs driving control for the sections of the SCARA robot 2, in particular, the driving section 26. The control device 3 is configured from, for example, a computer and includes a processor (a CPU) that processes information, a memory communicably coupled to the processor, and an external interface. Various programs executable by the processor are stored in the memory. The processor can read and execute the various programs and the like stored in the memory.

The control device 3 includes, as shown in FIG. 3, a driving control system 31 that performs driving control for the servomotors 26A included in the driving section 26. The driving control system 31 includes a band stop filter 311, a selector 312 that changes setting of the band stop filter 311, a position control section 313, a speed control section 314, and a current control section 315. In the following explanation, for convenience of explanation, a case in which an operation command Sd of a PTP (Point to Point) control scheme indicating "move from a start point Ps to an end point Pe" is input from a host computer HC is representatively explained.

A position command P0 serving as a control signal based on the operation command Sd from the host computer HC is input to the band stop filter 311. The position command P0 is generated at every control period interval. The band stop filter 311 is a filter circuit that removes a specific frequency component Hf from the position command P0. The "removes" includes attenuating the specific frequency component Hf to an extremely low level besides completely removing the specific frequency component Hf. A band pass filter may be used instead of the band stop filter 311. In this case, the band pass filter only has to be set to allow a frequency component other than the frequency component Hf to pass. In this specification, the band stop filter 311 is representatively explained. However, the explanation includes the use of the band pass filter.

The selector 312 controls ON/OFF of the band stop filter 311. The selector 312 can also change the frequency component Hf at the time when the band stop filter 311 is ON. When the band stop filter 311 is ON, the band stop filter 311 generates and outputs a corrected position command P1 serving as a corrected control signal obtained by removing the frequency component Hf from the position command P0. On the other hand, when the band stop filter 311 is OFF, the band stop filter 311 directly outputs the position command P0 without removing the frequency component Hf from the position command P0.

The position control section 313 performs position loop control based on the position command P0 or the corrected position command P1 output from the band stop filter 311 and a position feedback signal Fp output from the encoder 26B and outputs a speed command V0. The speed control section 314 performs speed loop control based on the speed command V0 output from the position control section 313 and a speed feedback signal Fv output from the encoder 26B and outputs an acceleration command A0. The current control section 315 outputs a current command E0 based on the acceleration command A0 output from the speed control section 314. The current command E0 output from the current control section 315 is supplied to the servomotor 26A and driving control for the servomotor 26A is performed.

The frequency component Hf removed by the band stop filter 311 includes a natural frequency f0 of the SCARA robot 2. More specifically, the frequency component Hf includes the natural frequency f0 in a posture at the end point Pe indicated by the operation command Sd. Therefore, by removing the frequency component Hf from the position command P0 using the band stop filter 311, resonance of the SCARA robot 2 can be suppressed and residual vibration can be reduced. The residual vibration means vibration that continues even after the robot arm 22 reaches the end point Pe and stops.

The natural frequency f0 of the SCARA robot 2 is indicated by Expression (1) described below. In Expression (1), k represents a spring constant and M represents a load. The spring constant k changes according to the posture of the robot arm 22. That is, if the posture of the robot arm 22 at the end point Pe is different, the natural frequency f0 is different for each operation command Sd for the robot arm 22. The load M is decided mainly by the weights of the robot arm 22, the hand 40, and the workpiece W. Usually, since the weights of the robot arm 22 and the hand 40 do not change during work, the load M is considered to change according to the weight of the workpiece W. Therefore, every time the control device 3 receives a new operation command Sd, the control device 3 calculates the natural frequency f0 from the posture of the robot arm 22 (a turning angle of the first arm 23 around the first turning axis J1, a turning angle of the second arm 24 around the second turning axis J2, a turning angle of the hand 40 around the third turning axis J3, and a position of the hand 40 in the third turning axis J3 direction) at the end point Pe included in the operation command Sd and the weight of the workpiece W held by the hand 40 and sets the frequency component Hf based on the calculated natural frequency f0.

$$f0 = \frac{1}{2\pi}\sqrt{\frac{k}{M}} \quad (1)$$

ON/OFF control for the band stop filter 311 by the selector 312 is explained. In a first case in which an operation based on the operation command Sd satisfies at least one condition of conditions A to F described below, the selector 312 controls the band stop filter 311 to OFF. That is, the control device 3 performs driving control for the driving section 26 using the position command P0. Conversely, in a second case in which all of the conditions A to F are not satisfied, the selector 312 controls the band stop filter 311 to ON. That is, the control device 3 performs driving control for the driving section 26 using the corrected position command P1. By controlling the band stop filter 311 to ON only in the case of the operation command Sd that satisfies a certain condition in this way, it is possible to improve work efficiency compared with when the band stop filter 311 is controlled to ON by all operation commands.

The work efficiency can be represented by a time required for one operation, that is, a "tact time". The tact time is determined by a total time T3 of an operation time T1 in which the robot arm 22 moves from the start point Ps to the end point Pe and a vibration convergence time T2 until the residual vibration converges to fixed amplitude or less after the robot arm 22 stops at the end point Pe. When the band stop filter 311 is ON, the residual vibration decreases because the resonance of the SCARA robot 2 is suppressed. Therefore, the vibration convergence time T2 is shorter compared with when the band stop filter 311 is OFF. On the other hand, the acceleration of the robot arm 22 decreases because the frequency component Hf is removed from the position command P0. Therefore, the operation time T1 is longer compared with when the band stop filter 311 is OFF.

That is, when a decrease of the vibration convergence time T2 is larger than an increase of the operation time T1, the tact time (the total time T3) can be reduced by controlling the band stop filter 311 to ON. However, when the decrease of the vibration convergence time T2 and the increase of the operation time T1 are the same degree, the tact time (the total time T3) cannot be reduced even if the band stop filter 311 is controlled to ON. When the decrease of the vibration convergence time T2 is smaller than the increase of the operation time T1, the tact time (the total time T3) increases to the contrary if the band stop filter 311 is controlled to ON. When the SCARA robot 2 performs an operation incompatible with the use of the band stop filter 311, it is also possible to achieve improvement of the work efficiency if the band stop filter 311 is controlled to OFF.

Therefore, in the robot system 1, when a reduction effect of the tact time is not expected even if the band stop filter 311 is controlled to ON or in the case of an operation incompatible with the band stop filter 311, ON/OFF of the band stop filter 311 is controlled to control the band stop filter 311 to OFF. The conditions A to F are explained in order below.

The condition A: the robot system 1 has a first driving mode and a second driving mode in which an upper limit value of acceleration of the robot arm 22 is smaller than that in the first driving mode, and a driving mode relating to the operation command Sd is the second driving mode.

The second driving mode is used, for example, at the time of a test for checking the movement of the robot arm 22. By performing the test in the second driving mode, since the movement of the robot arm 22 is slowed, it is possible to check the movement of the robot arm 22 safely and in detail. In such a second driving mode, since the movement of the robot arm 22 is slow, residual vibration at the stop time of the robot arm 22 is small and the vibration convergence time T2 is short. Therefore, if the band stop filter 311 is controlled to ON in such a case, It is highly likely that the increase of the operation time T1 is larger than the decrease of the vibration convergence time T2 and the tact time increases to the contrary. Therefore, when the driving mode relating to the operation command Sd is the second driving mode, the selector 312 controls the band stop filter 311 to OFF. Consequently, the increase of the tact time is suppressed and the work efficiency of the robot system 1 is improved.

The condition B: a separation distance D between a center of gravity Gh of the hand 40 and a distal end 22t of the robot arm 22 is equal to or larger than a predetermined value SH1. That is, $D \geq SH1$. The distal end 22t of the robot arm 22 means the distal end of the second arm 24.

If the separation distance D is large, it is likely that calculation accuracy of the natural frequency f0 decreases and the calculated natural frequency f0 and the actual natural frequency f0 greatly deviate. If the band stop filter 311 is controlled to ON in such a case, it is likely that an appropriate frequency component Hf including the actual natural frequency f0 is not set and the resonance of the SCARA robot 2 is not suppressed. In such a case, it is highly likely that a reduction of the vibration convergence time T2 cannot be achieved and only the operation time T1 simply increases. Therefore, in the case of $D \geq SH1$, the selector 312 controls the band stop filter 311 to OFF. Consequently, the increase of the tact time is suppressed and the work efficiency of the robot system 1 is improved. The predetermined value SH1 can be set as appropriate according to the configuration of the SCARA robot 2 and can be determined by, for example, an experiment or a simulation.

The condition C: The end point Pe of the robot arm 22 is unknown.

The end point Pe of the robot arm 22 being unknown means that the posture of the robot arm 22 at the end point Pe is unknown. Therefore, the spring constant k of the SCARA robot 2 at the end point Pe is unknown and the calculation accuracy of the natural frequency f0 decreases. If the calculation accuracy of the natural frequency f0 decreases, it is likely that the calculated natural frequency f0 and the actual natural frequency f0 greatly deviate. In such a case, if the band stop filter 311 is controlled to ON, it is likely that the appropriate frequency component Hf including the actual natural frequency f0 is not set and the resonance of the SCARA robot 2 is not suppressed. In such a case, it is highly likely that the reduction of the vibration convergence time T2 cannot be achieved and only the operation time T1 simply increases. Therefore, when the end point Pe of the robot arm 22 is unknown, the band stop filter 311 is controlled to OFF. Consequently, the increase of the tact time is suppressed and the work efficiency of the robot system 1 is improved.

The condition D: As shown in FIG. 4, when the robot arm 22 includes the second arm 24 functioning as an arm and the spline shaft 253 functioning as a shaft that rises and falls in the vertical direction with respect to the second arm 24, a projection amount L in the vertical direction of the spline shaft 253 from the second arm 24 is equal to or smaller than a predetermined value SH2. That is, $L \leq SH2$.

If the projection amount L is large, since the distance between the fulcrum of the spline shaft 253 and the hand 40 increases, rigidity decreases and the residual vibration at the stop time tends to increase. Conversely, if the projection amount L is small, since the distance between the fulcrum of the spline shaft 253 and the hand 40 decreases, the rigidity increases and the residual vibration at the stop time tends to decrease. Therefore, in the case of $L \leq SH2$, if the band stop filter 311 is controlled to ON, it is highly likely that the increase of the operation time T1 is larger than the decrease of the vibration convergence time T2 and the tact time increases to the contrary. Therefore, in the case of $L \leq SH2$, the band stop filter 311 is controlled to OFF. Consequently, the increase of the tact time is suppressed and the work efficiency of the robot system 1 is improved. It is preferable to set the predetermined value SH2 to a value at which the increase of the operation time T1 and the decrease of the vibration convergence time T2 are substantially equal.

The condition E: Load weight M3, which is a total of weight M1 of the hand 40 and weight M2 of the workpiece W held by the hand 40, is equal to or smaller than a predetermined value SH3. That is, $M3 \leq SH3$.

If the load weight M3 is large, since inertia generated in the hand 40 at the driving time of the robot arm increases, the residual vibration at the stop time increases. Conversely, if the load weight M3 is small, since the inertia generated in the hand 40 at the driving time of the robot arm 22 decreases, the residual vibration at the stop time decreases. Therefore, in the case of $M3 \leq SH3$, if the band stop filter 311 is controlled to ON, it is highly likely that the increase of the operation time T1 is larger than the decrease of the vibration convergence time T2 and the tact time increases to the contrary. Therefore, in the case of $M3 \leq SH3$, the band stop filter 311 is controlled to OFF. Consequently, the increase of the tact time is suppressed and the work efficiency of the robot system 1 is improved. It is preferable to set the predetermined value SH3 to a value at which the increase of the operation time T1 and the decrease of the vibration convergence time T2 are substantially equal.

The condition F: As shown in FIG. 5, an operation command for the robot arm 22 is corrected based on an output of a sensor 6 mounted on the SCARA robot 2. That is, the driving of the robot arm 22 is controlled based on the output of the sensor 6 mounted on the SCARA robot 2.

If the band stop filter 311 is controlled to ON, acceleration decreases because the frequency component Hf is removed from the position command P0. A moving track of the robot arm 22 deviates according to the decrease in the acceleration. Accordingly, it is difficult to finely control the position of the robot arm 22 based on the output of the sensor 6. Therefore, position control for feeding back the output of the sensor 6 and the use of the band stop filter 311 are incompatible. In such a case, the selector 312 controls the band stop filter 311 to OFF. The sensor 6 is not particularly limited. Examples of the sensor 6 include a force sensor 61 that detects force applied to the workpiece W, an acceleration sensor 62 that detects the acceleration of the robot arm 22, and an angular velocity sensor 63 that detects the angular velocity of the robot arm 22. In FIG. 5, as an example, a circuit for feeding back a detection signal of the angular velocity sensor 63 is illustrated.

The conditions A to F are explained above. Subsequently, a control method for the SCARA robot 2 by the control device 3 is explained. The control method includes, as shown in FIG. 6, a control-scheme determining step S11 for determining whether a received operation command Sd is a PTP control scheme and a determining step S12 for determining whether being in a first case in which at least one condition of the conditions A to F is satisfied or a second case in which all of the conditions A to F are not satisfied. In the second case, the control method further includes a frequency-component determining step S13 for determining the frequency component Hf to be removed from the position command P0 using the band stop filter 311, a corrected-control-signal generating step S14 for removing the frequency component Hf from the position command P0 using the band stop filter 311 to generate the corrected position command P1, and a first control step S15 for controlling the driving section 26 according to the corrected position command P1. In the first case, the control method does not perform the frequency-component determining step S13 and the corrected-control-signal generating step S14 and further includes a second control step S16 for controlling the driving section 26 according to the position command P0.

Control-Scheme Determining Step S11

In this step, first, in step S111, the control device determines whether the operation command Sd is the PTP control scheme. When the operation command Sd is the PTP control scheme, in step S112, the control device 3 executes the operation command Sd. Since the acceleration of the robot arm 22 decreases because the band stop filter 311 is used. A track of movement deviates according to the decrease in the acceleration. Therefore, a control scheme other than the PTP control scheme such as a CP control scheme for controlling a moving route is incompatible with the control method in this embodiment. Therefore, the control method in this embodiment is executed only in the case of the PTP control scheme.

Determining Step S12

In this step, the control device 3 determines whether being in a first case in which the operation command Sd satisfies at least one condition of the conditions A to F or a second case in which the operation command Sd does not satisfy all of the conditions A to F.

Frequency-Component Determining Step S13

This step is executed when it is determined as being in the second case in step S12. In this step, first, in step S131, the control device 3 calculates the natural frequency f0 in the posture of the SCARA robot 2 at the end point Pe based on the posture of the robot arm 22 at the end point Pe, the load weight M3, and the like. Subsequently, in step S132, the control device 3 determines the frequency component Hf to be removed using the band stop filter 311 to include the calculated natural frequency f0.

Corrected-Control-Signal Generating Step S14

In this step, the control device 3 controls the band stop filter 311 to ON and generates the corrected position command P1 obtained by removing the frequency component Hf from the position command P0.

First Control Step S15

In this step, the control device 3 controls the driving section 26 based on the corrected position command P1. That is, the control device 3 supplies the current command E0 generated based on the corrected position command P1 to the driving section 26 and performs driving control of the servomotor 26A.

Second Control Step S16

In this step, the control device 3 controls the band stop filter 311 to OFF, directly outputs the position command P0 from the band stop filter 311, and controls the driving section 26 based on the position command P0. That is, the control device 3 supplies the current command E0 generated based on the position command P0 to the driving section 26 and performs driving control of the servomotor 26A.

By controlling ON/OFF of the band stop filter 311 and using the band stop filter 311 only in the case of an operation command that can achieve improvement of work efficiency if the band stop filter 311 is used, it is possible to achieve improvement of the work efficiency of the robot system 1.

The robot system 1 is explained above. Such a robot system 1 includes, as explained above, the SCARA robot 2 including the robot arm 22 to which the end effector 4 is attached and the driving section 26 that drives the robot arm 22 and the control device 3 that controls the driving section 26 based on the position command P0 serving as a control signal. The control device 3 determines whether being in the first case in which at least one condition of the conditions A to E is satisfied or the second case in which all of the conditions A to E are not satisfied. In the first case, the control device 3 controls the driving section 26 based on the position command P0. In the second case, the control device 3 determines the frequency component Hf to be removed from the position command P0 using the band stop filter 311, removes the frequency component Hf from the position command P0 using the band stop filter 311 to generate the corrected position command P1 serving as the corrected control signal, and controls the driving section 26 based on the generated corrected position command P1. With such a configuration, the band stop filter 311 is used only in the case of an operation command that can achieve improvement of work efficiency if the band stop filter 311 is used. Therefore, it is possible to suppress an increase of the tact time and achieve improvement of the work efficiency of the robot system 1.

As explained above, the robot system 1 further has the condition F. The case in which at least one condition of the conditions A to F is set as the first condition and the case in which all of the conditions A to F are not satisfied is set as the second case. Consequently, it is possible to more surely suppress an increase of the tact time and achieve improvement of the work efficiency of the robot system 1.

As explained above, before determining the frequency component Hf, the control device 3 determines whether being in the first case or the second case. Consequently, it is easy to control the driving section 26.

As explained above, the control device 3 controls, based on the position command P0 serving as the control signal, the SCARA robot 2 including the robot arm 22 to which the end effector 4 is attached and the driving section 26 that drives the robot arm 22. The control device 3 determines whether being in the first case in which at least one condition of the conditions A to E is satisfied or the second case in which all of the conditions A to E are not satisfied. In the first case, the control device 3 controls the driving section 26 based on the position command P0. In the second case, the control device 3 determines the frequency component Hf to be removed from the position command P0 using the band stop filter 311, removes the frequency component Hf from the position command P0 using the band stop filter 311 to generate the corrected position command P1 serving as the corrected control signal, and controls the driving section 26 based on the generated corrected position command P1. With such a configuration, the band stop filter 311 is used only in the case of an operation command that can achieve improvement of work efficiency if the band stop filter 311 is used. Therefore, it is possible to suppress an increase of the tact time and achieve improvement of the work efficiency of the robot system 1.

The control method for the SCARA robot 2 by the control device 3 is, as explained above, the method of controlling, based on the position command P0 serving as the control signal, the SCARA robot 2 including the robot arm 22 to which the end effector 4 is attached and the driving section that drives the robot arm 22. Such a control method includes the determining step S12 for determining whether being in the first case in which at least one condition of the conditions A to E is satisfied or the second case in which all of the conditions A to E are not satisfied. In the second case, the control method further includes the frequency-component determining step S13 for determining the frequency component Hf to be removed from the position command P0 using the band stop filter 311, the corrected-control-signal generating step S14 for removing the frequency component Hf from the position command P0 using the band stop filter 311 to generate the corrected position command P1 as the corrected control signal, and the first control step S15 for controlling the driving section 26 according to the corrected position command P1. With such a control method, the band stop filter 311 is used only in the case of an operation command that can achieve improvement of work efficiency if the band stop filter 311 is used. Therefore, it is possible to suppress an increase of the tact time and achieve improvement of the work efficiency of the robot system 1.

As explained above, in the first case, the control method includes the second control step S16 for controlling the driving section 26 according to the position command P0. Consequently, it is easy to perform control in the first case.

As explained above, the control method further has the condition F. The case in which at least one condition of the conditions A to F is satisfied is set as the first condition and the case in which all of the conditions A to F are not satisfied is set as the second condition. Consequently, it is possible to more surely suppress an increase of the tact time and achieve improvement of the work efficiency of the robot system 1.

Second Embodiment

Figure 7:
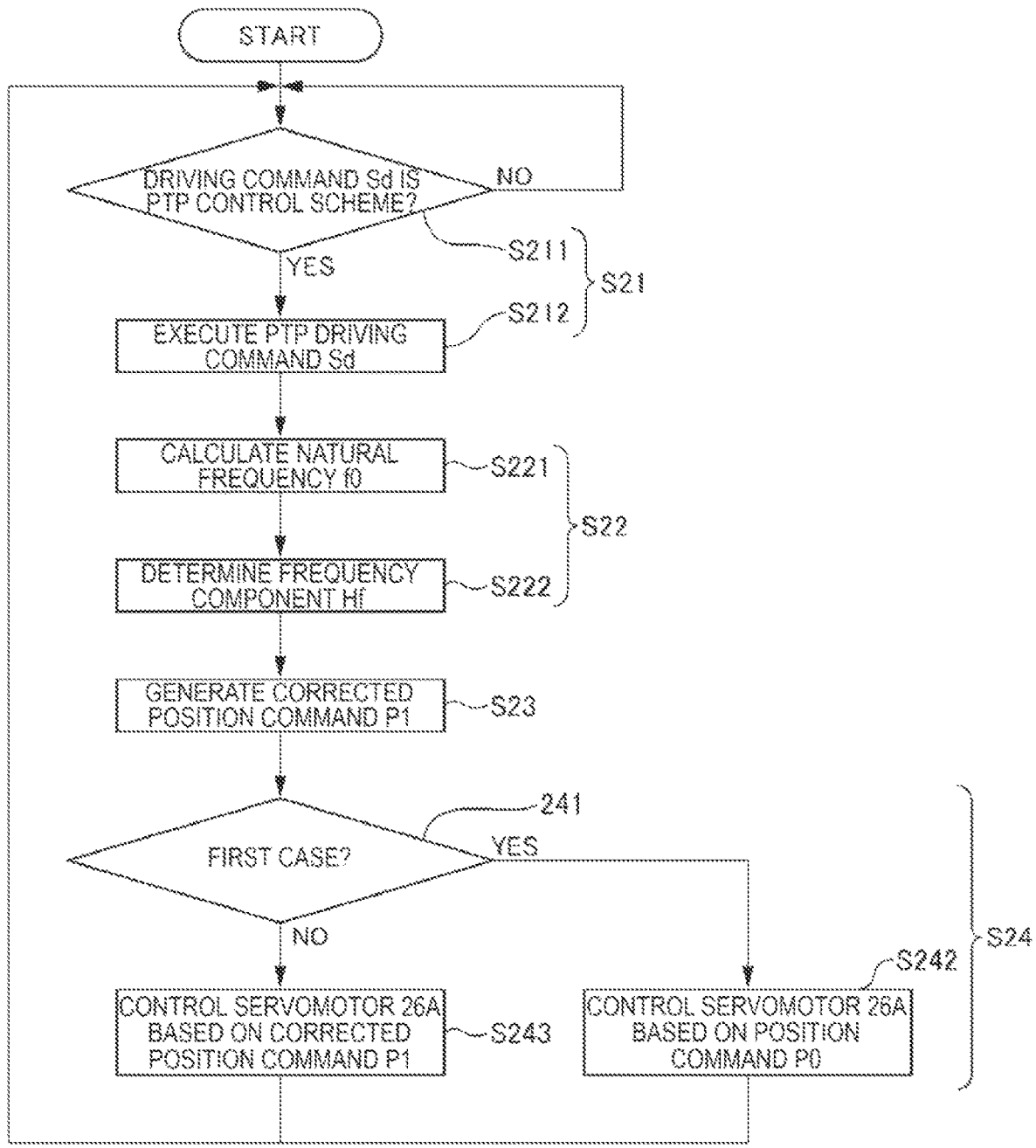
FIG. 7 is a flowchart showing a control method for a SCARA robot according to a second embodiment.

FIG. 7 is a flowchart showing a control method for a SCARA robot according to a second embodiment.

The robot system 1 in this embodiment is the same as the robot system 1 in the first embodiment except that mainly a control method for the SCARA robot 2 by the control device 3 is different. In the following explanation, concerning this embodiment, differences from the first embodiment are mainly explained. Explanation of similarities to the first embodiment is omitted. In FIG. 7, the same components as the components in the first embodiment are denoted by the same reference numerals and signs.

The control method for the SCARA robot 2 in this embodiment includes, as shown in FIG. 7, a control-scheme determining step S21 for determining whether the received operation command Sd is the PTP control scheme, a frequency-component determining step S22 for determining the frequency component Hf to be removed from the position command P0 using the band stop filter 311, a corrected-control-signal generating step S23 for removing the frequency component Hf from the position command P0 using the band stop filter 311 to generate the corrected position command P1, and a control step S24 for controlling the driving section 26 according to the position command P0 in a first case in which at least one condition of the conditions A to F is satisfied and controlling the driving section 26 according to the corrected position command P1 in a second case in which all of the conditions A to F are not satisfied.

Control-Scheme Determining Step S21

In this step, first, in step S211, the control device determines whether the operation command Sd is the PTP control scheme. When the operation command Sd is the PTP control scheme, in step S212, the control device 3 executes the operation command Sd.

Frequency-Component Determining Step S22

In this step, first, in step S221, the control device 3 calculates the natural frequency f0 in the posture of the SCARA robot 2 at the end point Pe based on the posture of the robot arm 22 at the end point Pe, the load weight M3, and the like. Subsequently, in step S222, the control device 3 determines the frequency component Hf to include the calculated natural frequency f0.

Corrected-Control-Signal Generating Step S23

In this step, the control device 3 controls the band stop filter 311 to ON, removes the frequency component Hf from the position command P0 to generate the corrected position command P1, and outputs the generated corrected position command P1.

Control Step S24

In this step, in step S241, the control device 3 determines whether being in a first case in which at least one condition of the conditions A to F is satisfied or a second case in which all of the conditions A to F are not satisfied. In the first case, in step S242, the control device 3 controls the band stop filter 311 to OFF and performs driving control for the driving section 26 using the position command P0 without using the corrected position command P1 generated in the corrected-control-signal generating step S23. Conversely, in the second case, in step S243, the control device 3 performs driving control for the driving section 26 using the corrected position command P1 generated in the corrected-control-signal generating step S23.

In this way, the control device 3 in this embodiment determines whether being in the first case or the second case after generating the corrected position command P1. With such a method as well, it is easy to control the SCARA robot 2.

As explained above, by controlling ON/OFF of the band stop filter 311 and using the band stop filter 311 only in the case of the operation command that can achieve improvement of work efficiency, it is possible to achieve improvement of the work efficiency of the robot system 1.

As explained above, in the robot system 1 in this embodiment explained above, after generating the corrected position command P1, the control device 3 determines whether being in the first case or the second case. With such a method as well, it is easy to control the SCARA robot 2.

The control method for the SCARA robot 2 by the control device 3 is, as explained above, the method of controlling, based on the position command P0 serving as the control signal, the SCARA robot 2 including the robot arm 22 to which the end effector 4 is attached and the driving section that drives the robot arm 22. Such a control method includes the frequency-component determining step S22 for determining the frequency component Hf to be removed from the position command P0 using the band stop filter 311, the corrected-control-signal generating step S23 for removing the frequency component Hf from the position command P0 using the band stop filter 311 to generate the corrected position command P1 serving as the corrected control signal, and the control step S24 for, in the first case in which at least one condition of the conditions A to E is satisfied, controlling the driving section 26 according to the position command P0 and, in the second case in which all of the conditions A to E are not satisfied, controlling the driving section 26 according to the corrected position command P1. With such a control method, the band stop filter 311 is used only in the case of an operation command that can achieve improvement of work efficiency. Therefore, it is possible to suppress an increase of the tact time and achieve improvement of the work efficiency of the robot system 1.

The robot system, the control device, and the control method according to the present disclosure are explained with reference to the embodiments shown in the drawings. However, the present disclosure is not limited to the embodiments. The sections configuring the robot system can be replaced with any components that can exert the same functions. Any components may be added.

Figure 8:
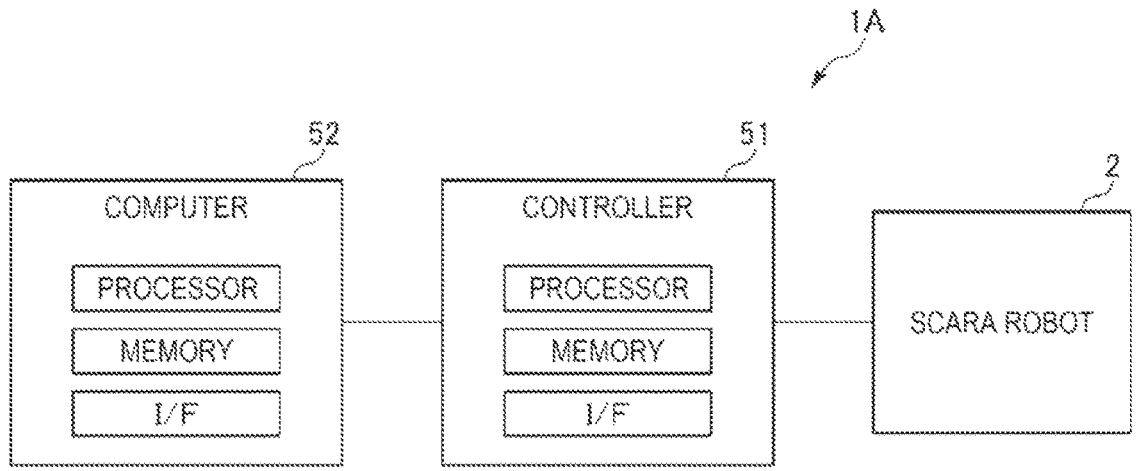
FIG. 8 is a block diagram showing a hardware configuration of a robot system.

A hardware configuration of the robot system is explained below. In FIG. 8, an overall configuration of a robot system 1A in which the SCARA robot 2, a controller 51, and a computer 52 are coupled is shown. Control of the SCARA robot 2 may be executed by reading out a command stored in a memory with a processor present in the controller 51 or may be executed via the controller 51 by reading out a command stored in a memory with a processor present in the computer 52. Therefore, one or both of the controller 51 and the computer 52 can be grasped as the "control device 3".

Figure 9:
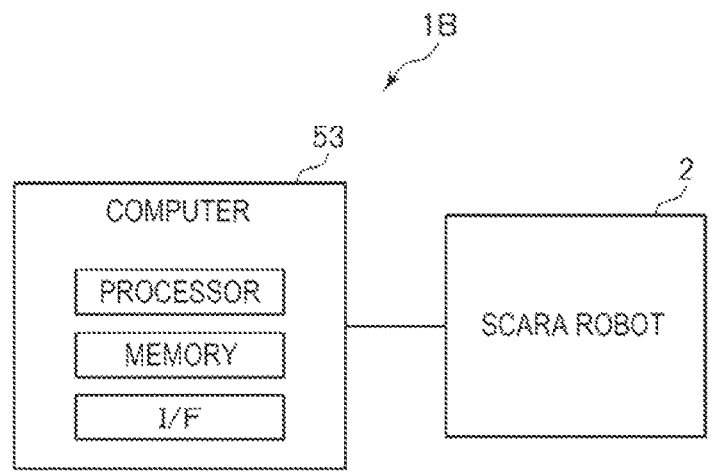
FIG. 9 is a block diagram showing a hardware configuration of a robot system.

In FIG. 9, an overall configuration of a robot system 1B in which a computer 53 is directly coupled to the SCARA robot 2 is shown. Control of the SCARA robot 2 is directly executed by reading out a command stored in a memory with a processor present in the computer 53. Therefore, the computer 53 can be grasped as the "control device 3".

Figure 10:
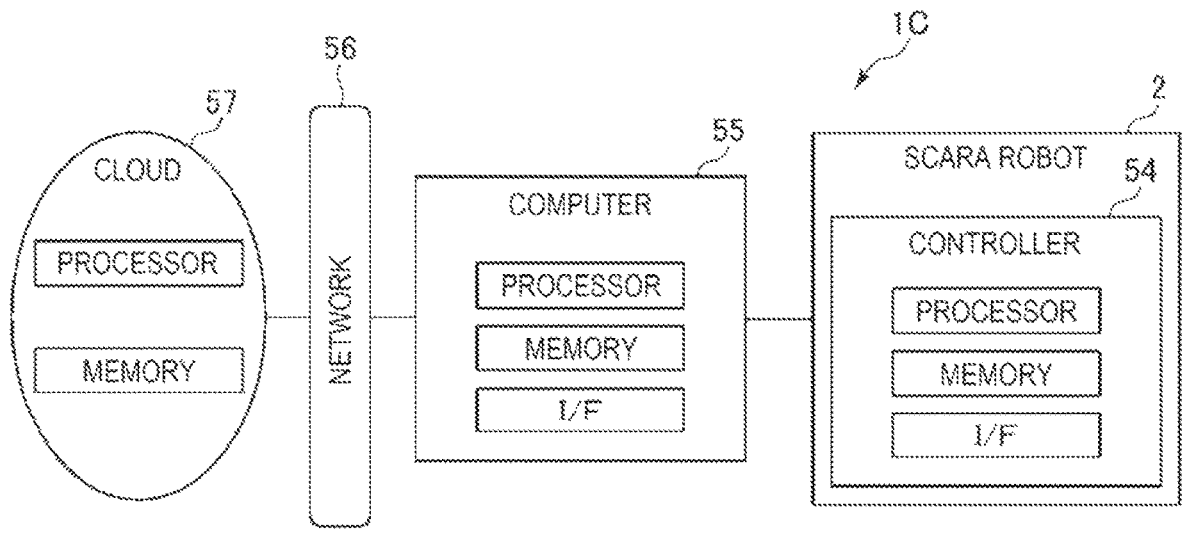
FIG. 10 is a block diagram showing a hardware configuration of a robot system.

In FIG. 10, an overall configuration of a robot system 1C in which the SCARA robot 2 incorporating a controller 54 and a computer 55 are coupled and the computer 55 is coupled to a Cloud 57 via a network 56 such as a LAN is shown. Control of the SCARA robot 2 may be executed by reading out a command stored in a memory with a processor present in the computer 55 or may be executed by reading out a command stored in a memory via the computer 55 with a processor present on the Cloud 57. Therefore, any one, any two, or three of the controller 54, the computer 55, and the Cloud 57 can be grasped as the "control device 3".

What is claimed is:

1. A robot system comprising:
a SCARA (selective compliance assembly robot arm) robot including a robot arm to which an end effector is attached and a motor configured to drive the robot arm;
a memory configured to store a program; and
a processor configured to execute the program so as to:
control the motor based on a control signal in a first case in which at least one condition of conditions A to E described below is satisfied; and
control the motor based on a corrected control signal in a second case in which all of the conditions A to E are not satisfied, wherein in the second case, the processor is further configured to:
determine a frequency component to be removed from the control signal using a band stop filter; and
remove the frequency component from the control signal using the band stop filter to generate the corrected control signal,
the condition A: the robot system has a first driving mode and a second driving mode in which an upper limit value of acceleration of the robot arm is smaller than that in the first driving mode and drives the robot arm in the second driving mode;
the condition B: a separation distance between a center of gravity of the end effector and a distal end of the robot arm is equal to or larger than a predetermined value;
the condition C: an end point of an operation of the robot arm is unknown;
the condition D: when the robot arm includes an arm and a shaft that rises and falls in a vertical direction with respect to the arm, a projection amount of the shaft in the vertical direction from the arm is equal to or smaller than a predetermined value; and
the condition E: a total of weight of the end effector and weight of a workpiece held by the end effector is equal to or smaller than a predetermined value.

2. The robot system according to claim 1, wherein
the robot system further has a condition F described below, and
a case in which at least one condition of the conditions A to F is satisfied is set as the first case and a case in which all of the conditions A to F are not satisfied is set as the second case:
the condition F: driving of the robot arm is controlled based on an output of a sensor mounted on the SCARA robot.

3. The robot system according to claim 1, wherein, before determining the frequency component, the processor is configured to determine whether being in the first case or the second case.

4. The robot system according to claim 1, wherein, after generating the corrected control signal, the processor is configured to determine whether being in the first case or the second case.

5. A control device that controls a SCARA (selective compliance assembly robot arm) robot including a robot arm to which an end effector is attached and a motor configured to drive the robot arm,
the control device comprising:
a memory configured to store a program; and
a processor configured to execute the program so as to:
control the motor based on a control signal in a first case in which at least one condition of conditions A to E described below is satisfied; and
control the motor based on a corrected control signal in a second case in which all of the conditions A to E are not satisfied, wherein in the second case, the processor is further configured to:
    determine a frequency component to be removed from the control signal using a band stop filter; and
    remove the frequency component from the control signal using the band stop filter to generate the corrected control signal,
the condition A: the control device has a first driving mode and a second driving mode in which an upper limit value of acceleration of the robot arm is smaller than that in the first driving mode and drives the robot arm in the second driving mode;
the condition B: a separation distance between a center of gravity of the end effector and a distal end of the robot arm is equal to or larger than a predetermined value;
the condition C: an end point of an operation of the robot arm is unknown;
the condition D: when the robot arm includes an arm and a shaft that rises and falls in a vertical direction with respect to the arm, a projection amount of the shaft in the vertical direction from the arm is equal to or smaller than a predetermined value; and
the condition E: a total of weight of the end effector and weight of a workpiece held by the end effector is equal to or smaller than a predetermined value.

6. A control method for controlling, based on a control signal, a SCARA (selective compliance assembly robot arm) robot including a robot arm to which an end effector is attached and a motor configured to drive the robot arm,
    the control method for causing a processor to execute a program stored in a memory, the control method comprising executing on the processor the steps of:
    a frequency-component determining step for determining a frequency component to be removed from the control signal using a band stop filter;
    a corrected-control-signal generating step for removing the frequency component from the control signal using the band stop filter to generate a corrected control signal; and
    a control step for, in a first case in which at least one condition of conditions A to E described below is satisfied, controlling the motor according to the control signal, and, in a second case in which all of the conditions A to E are not satisfied, controlling the motor according to the generated corrected control signal:
    the condition A: the control method has a first driving mode and a second driving mode in which an upper limit value of acceleration of the robot arm is smaller than that in the first driving mode and drives the robot arm in the second driving mode;
    the condition B: a separation distance between a center of gravity of the end effector and a distal end of the robot arm is equal to or larger than a predetermined value;
    the condition C: an end point of an operation of the robot arm is unknown;
    the condition D: when the robot arm includes an arm and a shaft that rises and falls in a vertical direction with respect to the arm, a projection amount of the shaft in the vertical direction from the arm is equal to or smaller than a predetermined value; and
    the condition E: a total of weight of the end effector and weight of a workpiece held by the end effector is equal to or smaller than a predetermined value.

7. A control method for controlling a SCARA (selective compliance assembly robot arm) robot including a robot arm to which an end effector is attached and a motor configured to drive the robot arm,
    the control method for causing a processor to execute a program stored in a memory, the control method comprising executing on the processor the steps of:
    controlling the motor based on a control signal in a first case in which at least one condition of conditions A to E described below is satisfied; and
    controlling the motor based on a corrected control signal in a second case in which all of the conditions A to E are not satisfied, wherein in the second case, the processor is further configured to:
        determine a frequency component to be removed from the control signal using a band stop filter; and
        remove the frequency component from the control signal using the band stop filter to generate the corrected control signal,
    the condition A: the control method has a first driving mode and a second driving mode in which an upper limit value of acceleration of the robot arm is smaller than that in the first driving mode and drives the robot arm in the second driving mode;
    the condition B: a separation distance between a center of gravity of the end effector and a distal end of the robot arm is equal to or larger than a predetermined value;
    the condition C: an end point of an operation of the robot arm is unknown;
    the condition D: when the robot arm includes an arm and a shaft that rises and falls in a vertical direction with respect to the arm, a projection amount of the shaft in the vertical direction from the arm is equal to or smaller than a predetermined value; and
    the condition E: a total of weight of the end effector and weight of a workpiece held by the end effector is equal to or smaller than a predetermined value.

8. The control method according to claim 6, wherein
the control method further has a condition F described below, and
a case in which at least one condition of the conditions A to F is satisfied is set as the first case and a case in which all of the conditions A to F are not satisfied is set as the second case:
    the condition F: driving of the robot arm is controlled based on an output of a sensor mounted on the SCARA robot.

* * * * *